Aug. 30, 1932.  W. H. WOOD  1,874,404
STORAGE BATTERY
Filed Dec. 6, 1928
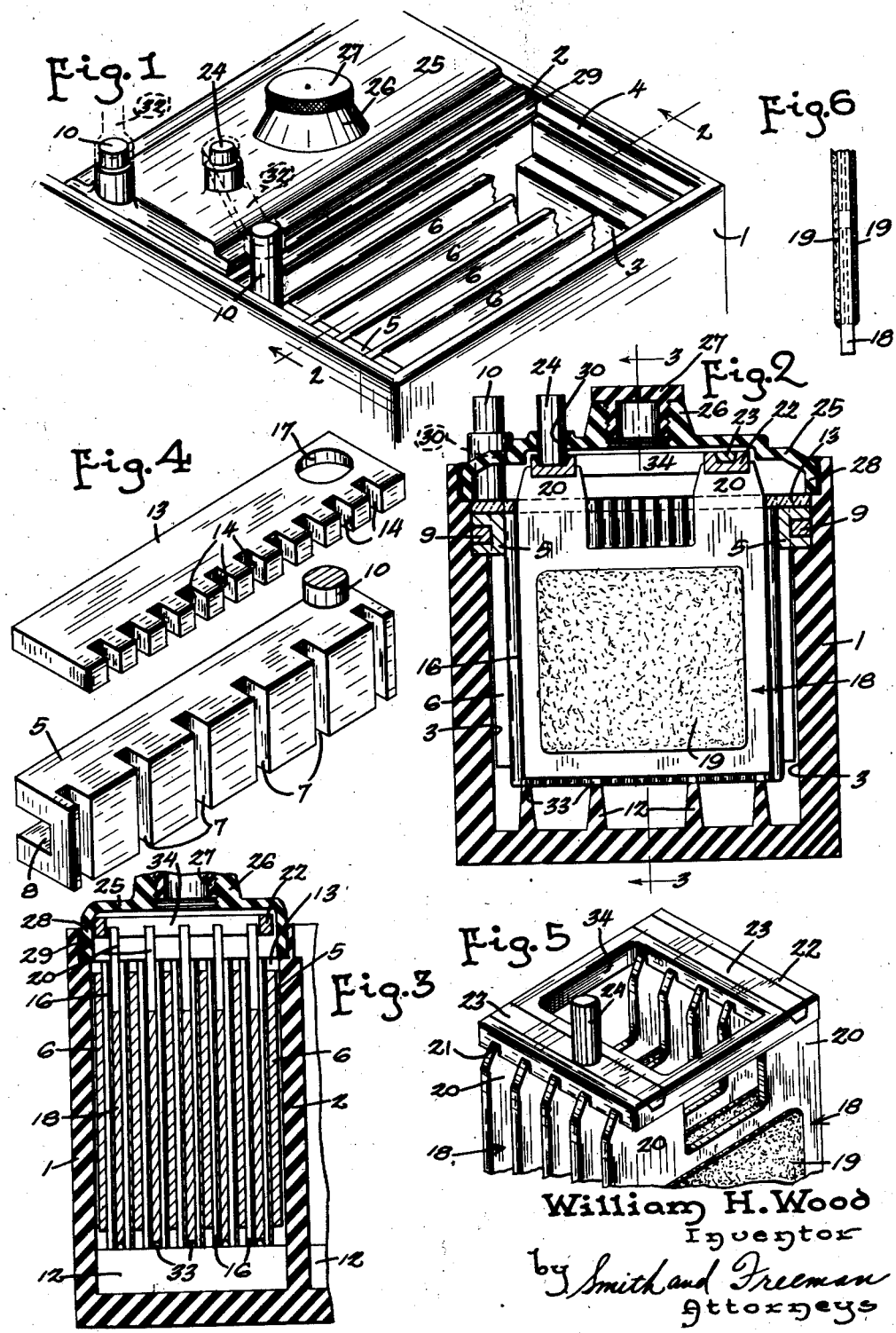
William H. Wood
Inventor
by Smith and Freeman
Attorneys Patented Aug. 30, 1932

1,874,404

UNITED STATES PATENT OFFICE

WILLIAM H. WOOD, OF SOUTH EUCLID, OHIO

STORAGE BATTERY

Application filed December 6, 1928. Serial No. 324,234.

This invention relates to storage batteries and has for its object the provision of a distinctly new type of lead accumulator designed particularly for automobile use. The indispensable elements of such a battery have become well established as a container, positive plates, negative plates, separators, and an electrolyte. All of these elements are comparatively long-lived excepting the positive plates; but heretofore, it has been the practice to discard the entire battery as soon as the positive plates became disintegrated, despite the fact that all the other elements were capable of successful operation for a much longer period of time. The objects of the present invention are the provision of a new and improved battery so constructed as to enable the ready and convenient replacement of the positive elements whenever the same give trouble, without disturbing the negative plates or separators or allowing them to become injured by exposure; the provision of as an article of manufacture and sale of separable positive elements for storage batteries, adapted to be introduced therein upon necessity in much the same way that a new lamp bulb is introduced in an automobile headlight; the provision of a new and improved construction of battery wherein the parts are held more firmly than heretofore and with less opportunity of vibration or short circuits; the provision of a battery of higher power per unit weight than heretofore; while further objects and advantages of the invention will become apparent as the description proceeds.

In the drawing accompanying and forming a part of this application I have shown a preferred embodiment of my inventive idea although it will be understood that the same are intended merely to be illustrative of the essentials of my improvements which can be embodied in a great many other physical forms. Fig. 1 is a perspective view of part of a three-cell automobile battery, partly dismantled but containing my improvements; Fig. 2 is a vertical sectional view corresponding to the line 2—2 of Fig. 1; Fig. 3 is a vertical sectional view corresponding to the line 3—3 of Fig. 2; Fig. 4 is a separated perspective view of a part of the negative bar and separator support used in connection with the particular embodiment herein illustrated; Fig. 5 is a perspective view of a part of the positive gang removed from the cell and; Fig. 6 is an edge view of a part of one positive plate drawn to larger scale.

In this particular embodiment I have chosen for purposes of illustrating my inventive idea, a single rectangular box or casing 1 provided with a plurality of separate rectangular chambers or cells separated by partitions 2, each cell having end walls 3 preferably constituted by the side wall of the box 1 and rabbeted at their upper ends as shown at 4 for the reception of rectangular lead bars 5 whereby the negative plates 6—6 are fastened together. Each of these lead bars is preferably made of sufficient length to traverse the entire width of the cell, and of sufficient thickness to overlap the inner wall 3 thereof as shown in Fig. 2, such overlapping portion being formed with narrow vertical slots 7 in which the marginal portions of the negative plates are received. These plates are then welded or "burned" into permanent electrical contact with the bars 5, for which purpose I have shown the rear face of each bar as formed with a longitudinal channel 8 intersecting the slots 7—7 and serving for the reception of molten lead or lead-alloy illustrated at 9 whereby the plates are permanently secured in place. Preferably two of these bars are used, one at each side of each cell, one of the same being formed with an upstanding integral cylindrical post 10 constituting the negative terminal of that cell. Of course the other bar can be provided with a like post if desired, but where such bar is used I preferably employ it merely to strengthen and steady the plates and not to constitute a terminal. It is also within my invention to substitute for the second of these lead bars a bar of non-metallic, acid-proof material, such for example as hard rubber or other wax or gum, which shall have merely the supporting function without electrical conducting function and need not necessarily adhere or be fastened to the plates. There are advantages from an electrical standpoint of using a conducting bar at each side, but for low priced batteries it is permissible to omit this refinement at one side of the jar, although it is desirable to provide means for holding the negative plates firmly in position.

These negative plates, when mounted in the jar as I have described, define a series of narrow, rectangular, vertical pockets parallel to the partitions 2; and the upper ends of the negative plates preferably terminate flush with the tops of the bars as shown at the left hand side of the first cell of Fig. 1. The bottom of each cell is preferably formed with the series of longitudinally up-standing ribs 12 illustrated in Figs. 2 and 3 defining sediment chambers, and the lower ends of the negative plates preferably terminate a short distance above these ribs as shown in Figs. 2 and 3.

On top of each of the bars 5 I lay a flat oblong plate 13 of hard-rubber (or other acid-proof, non-conducting, and non-metallic material having the herein essential properties of hard rubber), its length being such as to extend from one side wall of the cell to the other, and its width being such as to cause it to overhang the bars 5—5 as shown in Fig. 2. At its inner edge each of these plates is formed with a plurality of rectangular notches 14 adapted for the reception of the edges of the separators 16, which separators can be made either of porous wood or some kind of rubber or other acid-proof plate having pervious portions of porous organic or inorganic material. The plates 13 are apertured at 17 for the terminal posts 10.

These separators are located, one at each side of each of the pockets defined by the negative plates, and are spaced apart for the reception of the positive plates, and the upper edges of the separators terminate substantially at the top of the strips 13 as shown in Fig. 2. In the middle of each pocket between the separators is a positive plate consisting of a lead frame 18 having active material pasted thereon as shown at 19. The upper edge of each frame is formed at least at one side, (and preferably at both sides), with upstanding ears 20 whose upper ends are received in suitable slots 21 formed in the lead frame 22 and burned permanently in place by other lead or alloy or solder as shown at 23. Carried by this frame at one place is an upstanding lead post 24 constituting the positive terminal.

The top of each cell is closed by means of a rectangular cover 25 of hard rubber or other molded, non-metallic, acid-proof organic material, formed at its center with an upstanding hollow neck 26 threaded or otherwise formed for the reception of the removable cap 27 and formed around its edge with a depending flange 28 adapted to rest in a rabbet 29 surrounding the upper end of each cell compartment. This flange preferably rests more or less on the strips 13 and helps hold them and the separators in place. The terminals 10 and 24 project through suitable apertures 30 formed in this cover, and the edges together with these apertures are sealed by melted pitch or the like according to the usual battery practice. The adjacent terminals are connected by means of the usual lead strips 32.

In order to hold the lower ends of the separators in place and retain a space for the introduction of the positives, the upper edges of the ribs 12 are preferably formed with wedge-shaped projections 33 as shown in Figs. 2 and 3, adapted to project upwardly between the lower edges of the separators. The positive plates preferably depend into contact with the tops of these projections which therefore support the weight of the positive elements without reference to the cover, although the posts 24 are subsequently sealed to the cover as described, which holds the positive element against injurious vibration. The top frame 22 of the positive terminal is formed with a central aperture 34 in line with the neck 26 to enable the insertion of a syringe, but is preferably continuous all around this aperture the better to hold the positive plates in position both before and after insertion.

The battery is assembled in the order that the parts have been described. The negative and positive plates can be "formed" (that is to say, electrolyzed to reduce and oxidize them respectively) either before or after their introduction into the cells according to the particular process preferred by the manufacturer. The positive plates are preferably "overpasted", that is to say, the paste 19 is preferably applied in such a thick layer as to project outwardly from the plate to a greater distance than the grid part 18 as illustrated in Figs. 5 and 6. The chemical and electro-chemical action of my improved battery is that customary in other lead type batteries. Any desired composition of paste can be employed, although it is desirable to employ some kind of capillarity-increasing or porosity-forming ingredient as described and claimed, for example, in my prior Patents Nos. 1,405,702, 1,405,703, and 1,432,937. When for any reason the positive plates become disintegrated as they are practically certain to do before the other elements of the battery have served their full life, it is possible to remove the positives merely by unsealing the cover with the aid of heat and removing the same together with the positive elements bodily from the cell, after which new positive elements can easily be introduced. Ordinarily, when this is done, it is best to wash out the accumulated sediment from the bottom of the cell by laying the battery box on its side and flushing each of the empty cells with a hose so as to wash the sediment out between the negatives and separators, neither of which requires to be removed. If this be done with reasonable rapidity and the cell be immediately reassembled and refilled with electrolyte neither the negatives nor the separators receive any injury. It is only necessary to protect the negative plates and separators from any exposure to the air for more than a few minutes duration else the sulphuric acid remaining in the pores will act injuriously thereon. Immediate filling with electrolyte of the proper working strength is sufficient for this protection; or if this be inconvenient, it is enough if the cell be kept filled with water until it is convenient to reassemble the same; or if it be desired to keep it dry, then it should be treated with concentrated solution of magnesium or sodium sulphate in accordance with my Patent No. 1,570,115. My positive elements with which the cells are refilled are preferably made up in advance into gangs of the proper size; and they may also be electrolyzed in advance if desired to change their lead to lead peroxide as in the usual charged battery; but it is enough for practical purposes if the plates be merely pasted with a proper red-lead paste as customary in the manufacture of positive plates, since under ordinary conditions such a positive is sufficient for automobile operation and the active material becomes gradually oxidized to lead peroxide during the operation of the vehicle. If the positives be replaced with reasonable rapidity as herein described, care being taken not to expose the negative plates unduly to the air the electrical charge is not sensibly lost.

The employment of this removable positive element enables various secondary changes to be made in the battery. For example it becomes feasible to increase the strength and activity of the negative plates since dissolution of the positive plates is no longer a matter to be dreaded; and also the activity of the battery can be increased by increasing the strength of the electrolyte which has heretofore been restricted by the consideration of preserving the positives against disintegration. Furthermore it becomes practically feasible to design the positive plates for performance rather than for longevity as a combined result it becomes possible to secure an amount of battery performance necessary for the successful operation of an automobile with a substantially smaller and less expensive battery than heretofore.

Owing to the many changes in detail which can be made and still secure the benefits and advantages of my invention I do not limit myself to any of the details or constructions herein described except as specifically recited in my annexed claims, which I desire may be construed broadly, each independently of limitations contained in other claims.

Having thus described my invention what I claim is:

1. In a lead type storage cell, in combination, a receptacle having spaced parallel side walls and spaced recessed end walls, negative plates located in said receptacle in spaced relation parallel to said side walls, steadying and supporting bars located in said recesses and operatively engaging the vertical margins of said negative plates, one at least of said bars consisting of metallic lead and having a projecting terminal post, a positive plate located between each pair of negative plates and extending vertically above said negative plates, a single metallic member to which all said positive plates are secured, said member being located above said negative plates, means supporting said positive plates independently of said negative plates, separators located between adjacent plates, and a cover for the cell.

2. In a lead type storage cell, in combination, a receptacle having spaced parallel side walls and spaced recessed end walls, negative plates located in said receptacle in spaced relation parallel to said side walls, steadying and supporting bars located in said recesses and operatively engaging the vertical margins of said negative plates, one at least of said bars consisting of metallic lead and having a projecting terminal post, a positive plate located between each pair of negative plates and rigidly supported at the bottom from the bottom of the cell, the upper ends of the positive plates projecting above the negative plates, a single metallic member to which the upper ends of all said positive plates are secured, said member being located above said negative plates and having a projecting terminal post, and a cover for said cell in which said terminal post is sealed.

3. A lead type storage battery having horizontal lead connecting bars fastened to both vertical margins of the negative plates and received in recesses formed for that purpose in the side walls of the receptacle, and other horizontal lead connecting bars fastened to the top margins of the positive plates above the level of the negative plates and having projecting means secured in the cell cover.

4. A lead type storage battery having horizontal connecting bars fastened to the vertical margins of the negative plates and received in recesses formed for that purpose in the side walls of the receptacle, there being for each cell at least one such bar which is made of lead, a horizontal strip of insulating material overlying and overlapping each bar and having vertical notches in its overlapping part, separators located between adjacent negative plates with their edges received in said notches, and positive plates located between said separators with their edges spaced from said bars by the overlapping portions of said strips.

5. A lead type storage battery having horizontal strips of insulating material located in recesses formed for that purpose in the receptacle walls, said strips overlapping the faces of the walls, vertical slots in such overlapping portions, separators having their vertical edges located in said slots, the bottoms of the cells having notched means for receiving the lower edges of said separators, and positive and negative plates located in the spaces defined between successive separators.

6. A lead type storage battery having horizontal strips of insulating material located in recesses formed for that purpose in the receptacle walls, said strips overlapping the faces of the walls, vertical slots in such overlapping portions, separators having their vertical edges located in said slots, the bottoms of the cells having notched means for receiving the lower edges of said separators, positive and negative plates located in the spaces defined between successive separators, and horizontal lead bars connecting such positive plates together and such negative plates together, the positive and negative bars being located on opposite horizontal sides of said strips.

7. A battery box having cell compartments cast therein, each compartment having a recess at its upper end, a lead bar in said recess and having vertical notches, negative plates in said cell their edges fitting in the notches, a strip of insulating material overlying said lead bar and having notches at its edge, separators located in said notches, and means holding the lower ends of said negative plates and separators in the desired relative position.

8. A battery box having cell compartments cast therein, each compartment having a recess at its upper end, a lead bar in said recess and having vertical notches, negative plates in said cell their edges fitting in the notches, a strip of insulating material overlying said lead bar and having notches at its edge, separators located in said notches, positive plates located between the separators which are interposed between adjacent negative plates, and horizontal lead bars connected to the upper ends of said positive plates and connecting them together, said bars being located at a higher level than said strip.

In testimony whereof I hereunto affix my signature.

WILLIAM H. WOOD.